(12) United States Patent
Klein

(10) Patent No.: US 6,496,853 B1
(45) Date of Patent: Dec. 17, 2002

(54) METHOD AND SYSTEM FOR MANAGING RELATED ELECTRONIC MESSAGES

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/351,973

(22) Filed: Jul. 12, 1999

(51) Int. Cl.[7] .............................................. G06F 15/16
(52) U.S. Cl. ...................................................... 709/206
(58) Field of Search ................................ 709/232, 206

(56) References Cited

U.S. PATENT DOCUMENTS

| | | | |
|---|---|---|---|
| 5,363,090 A | * | 11/1994 | Cannon et al. |
| 5,754,778 A | | 5/1998 | Shoujima ............... 395/200.36 |
| 5,826,022 A | | 10/1998 | Nielsen ................. 395/200.36 |
| 5,923,848 A | | 7/1999 | Goodhand et al. ..... 395/200.49 |
| 5,948,058 A | | 9/1999 | Kudoh et al. ................ 709/206 |
| 5,999,932 A | | 12/1999 | Paul ............................ 707/10 |
| 6,044,395 A | | 3/2000 | Costales et al. ............ 709/206 |
| 6,092,101 A | | 7/2000 | Birrell et al. ............... 709/206 |
| 6,092,103 A | * | 7/2000 | Pritsch |
| 6,128,101 A | | 10/2000 | Saito .......................... 358/402 |
| 6,167,434 A | | 12/2000 | Pang .......................... 709/206 |
| 6,266,692 B1 | | 7/2001 | Greenstein ................. 709/206 |
| 6,289,372 B1 | | 9/2001 | Vyaznikov ................. 709/206 |

FOREIGN PATENT DOCUMENTS

| | | | |
|---|---|---|---|
| JP | 10-041974 | | 2/1998 |
| JP | 10-222438 | * | 8/1998 ........... G06F/13/00 |

* cited by examiner

Primary Examiner—John A. Follansbee
(74) Attorney, Agent, or Firm—Dorsey & Whitney LLP

(57) ABSTRACT

A system for managing messages so that messages with redundant contents need not be reviewed by a user. Techniques of the invention monitor electronic messages received by a user and determine whether the received electronic messages are related to pending electronic messages for the user, such as by being part of the same message thread. Messages with redundant contents among the related messages are then identified, and the messages with redundant contents are managed so that the user need not review the contents. The messages with redundant contents can be managed by creating a new message which includes the unique contents of each of the identified messages but at most a single copy of the redundant contents. After the new message is created, the identified messages can then be indicated to be redundant in light of the newly created message in one or more ways, such as by deleting the identified messages or by altering the visual indicators of the identified messages presented to the user. Alternately, the messages with redundant contents can be managed by deleting the redundant contents from the identified messages, or by altering the manner in which the redundant contents are presented to allow for easy identification by the user.

49 Claims, 9 Drawing Sheets

Fig. 2C

| User 1 | User 2 | User 3 | User 4 |
|---|---|---|---|
| m1 | m1 | m1 | m1 |
| m2(m1) | m3(m1) | m3(m1) | m3(m1) |
| m3(m1) | | m5(m3:m1) | m4(m1) |
| | | m6(m3:m1) | m5(m3:m1) |
| | | | m7(m5:m3:m1 & m6:m3:m1) |

Fig. 2D

| User 1 | User 2 | User 3 | User 4 |
|---|---|---|---|
| m1 | m3(m1) | m9 φ (m6:m3:m1 & m5) | m10 φ (m1 & m3 & m4 & m5 & m7:m6) |
| m8 φ (m2 & m3) | | | |

METHOD AND SYSTEM FOR MANAGING RELATED ELECTRONIC MESSAGES

TECHNICAL FIELD

The present invention relates generally to communicating via electronic messages, and more particularly to identifying and managing related electronic messages.

BACKGROUND OF THE INVENTION

Electronically-communicated messages ("electronic messages" or "electronic communications") such as email, voicemail, paging messages, and transmitted documents have become increasingly popular and pervasive in recent years. The ability to send an electronic message to multiple recipients provides for quick and efficient communication, and the use of electronic messages has become common in business settings.

While electronic messages can be specified in a variety of formats, a typical electronic message will include substantive contents to be conveyed (e.g., text and/or images) as well as a preceding header with various identifying information about the message. For example, a header of an electronic email message might include an identification of the sender and of the recipients, as well as a subject for the message. Headers can also include information such as the size of the message, a specification of the encoding used for the message (e.g., a particular compression algorithm), a specification of the transmission protocol for which the message was created (e.g., TCP/IP), or a unique identifier for the message.

While a user can create and send a message independent of any other messages, messages are often part of a message thread. A message thread is a group of messages that are related to each other, such as when one message is a response to (e.g., a reply to or a forwarding of) another message. Messages in the same message thread will typically share various common message information, such as related subjects or common message content. For example, a reply email or voicemail will often include the contents of the original message as well as additional contents specific to the reply, and the subject line of a reply or forwarded email will often include the original subject line along with a relation indicator such as "RE:" or "FW:" respectively.

Consider, for example, the following situation in which co-workers send a series of emails that are part of a single message thread back and forth to each other, and each response message contains the contents of the message being responded to as well as additional unique content. Worker A first sends message 1 to workers B and C and to supervisor D. Worker B responds to message 1 with response message 2 sent to A and D, and worker C responds to message 1 with a distinct response message 3 sent to A and D. Thus, supervisor D has received message 1, message 2 which includes the contents of message 1 as well as additional contents, and message 3 which includes the contents of message 1 as well as additional contents.

While message threads can provide various benefits, receiving message thread messages can also create various problems. For example, a recipient of multiple message thread messages will often receive multiple messages that include common content. In the example above, supervisor D received the contents of message 1 in three different messages. After the contents of message 1 has been received the first time (e.g., from receiving message 1), those contents become redundant for that message recipient when they are included in the contents of other received message thread messages (e.g., such as response messages 2 and 3).

Current mechanisms for managing pending messages for a user create problems with respect to message thread messages with redundant contents. Pending messages for a user include those messages which have been received but not yet reviewed, as well as those messages which have been reviewed and retained. When a user has received multiple messages that are part of a common message thread, current message management mechanisms store and present each such message to the user. However, when the pending messages for a user include messages with contents that are redundant in light of the contents of other pending messages, various inefficiencies result. For example, extra computer resources are needed for the storage and presentation of the redundant contents, and extra time is needed by the user to review each message and to determine what contents are new and what contents are redundant.

SUMMARY OF THE INVENTION

The present invention provides a method and system for managing messages so that messages with redundant contents need not be reviewed by a user. Techniques of the invention monitor electronic messages received by a user and determine whether the received electronic messages are related to pending electronic messages for the user, such as by being part of the same message thread. Messages with redundant contents among the related messages are then identified, and the messages with redundant contents are managed so that the user need not review the contents. The messages with redundant contents can be managed by creating a new message which includes the unique contents of each of the identified messages but at most a single copy of the redundant contents. After the new message is created, the identified messages used to create the new message can then be indicated to be redundant in light of the newly created message in one or more ways, such as by deleting the identified messages or by altering the visual indicators of the identified messages presented to the user. Alternatively, the messages with redundant contents can be managed by deleting the redundant contents from the identified messages, or by altering the manner in which the redundant contents are presented to allow for easy identification by the user.

In one aspect of the invention, multiple electronic messages sent to the user are identified, at least two of the electronic messages are determined to have contents that each include the contents of another electronic message, and a new electronic message is generated containing the contents of the determined electronic messages in such a manner that the new electronic message contains only a single copy of the contents of the other electronic message.

BRIEF DESCRIPTION OF THE DRAWINGS

FIGS. 2A–2C illustrate examples of messages sent as part of a message thread, and FIG. 2D illustrates an example of the sent messages after they are managed by an embodiment of the system of the present invention.

DETAILED DESCRIPTION OF THE INVENTION

The present invention provides a method and system for identifying and managing electronic messages with redundant contents received by a user. In particular, a Message Manager system monitors electronic messages received by a user, determines whether the received electronic messages are related to pending electronic messages for the user, and identifies messages with redundant contents among the related messages. After identifying messages with redundant contents, the Message Manager system manages the pending messages so that the user need not review the redundant contents.

Figure 1:
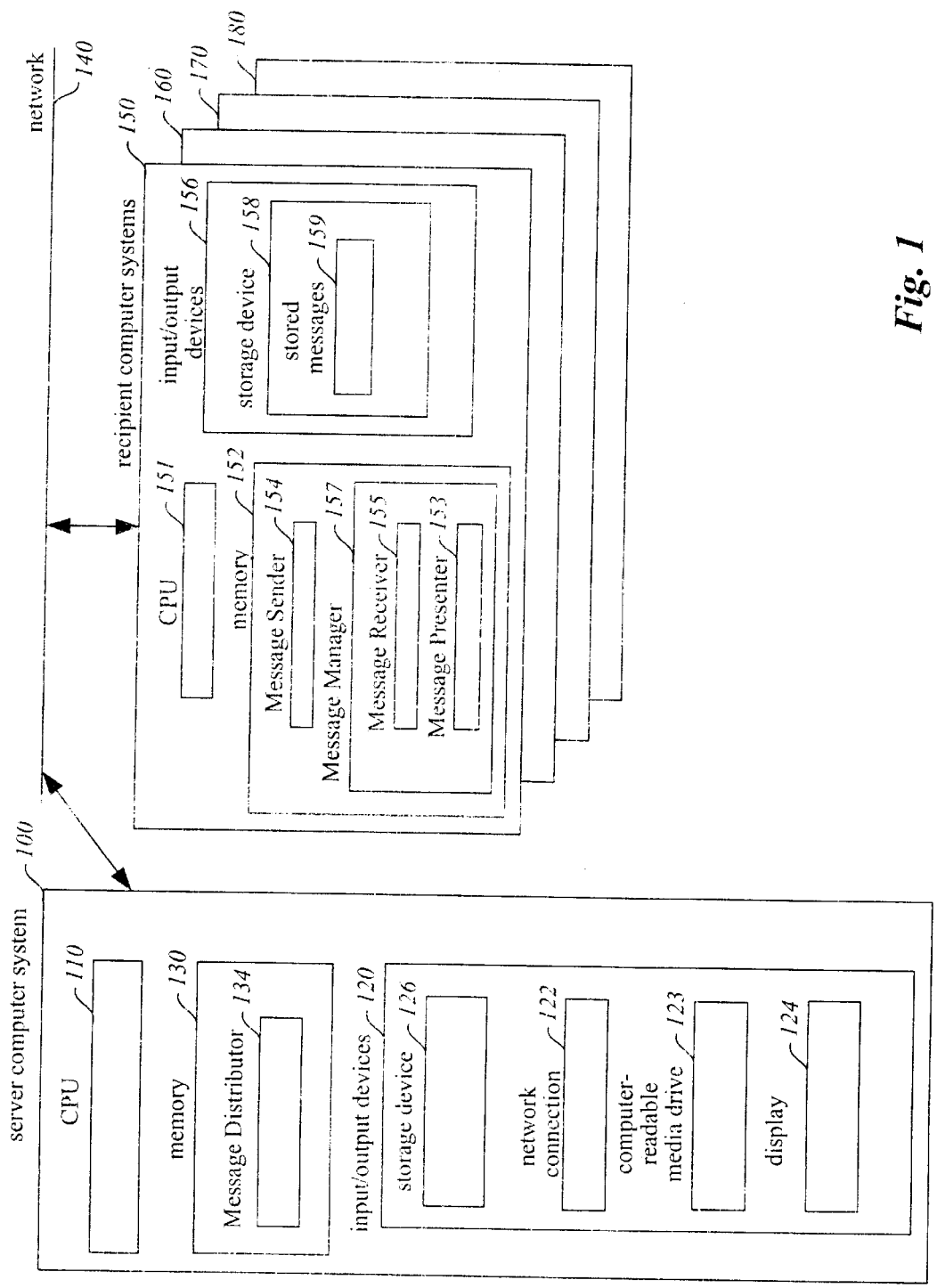
FIG. 1 is a block diagram illustrating an embodiment of the Message Manager system of the present invention.

FIG. 1 illustrates message recipient computer systems 150, 160, 170, and 180 each suitable for executing a Message Manager system 157 on behalf of the users (not shown) of those computer systems. For the sake of brevity, only computer system 150 is shown in detail. The computer system 150 includes a CPU 151, input/output devices 156, and a memory 152. The input/output devices 156 include a storage device 158 on which is stored messages 159 that have been received by the user of computer system 150 and that are still pending. The input/output devices 156 may also include a variety of other devices (not shown). The memory 152 stores an executing copy of the Message Manager system 157, as well as an executing copy of a Message Sender component 154 that enables the user to send messages to other users.

The Message Manager system 157 includes a Message Receiver component 155 and a Message Presenter component 153. The Message Receiver component 155 monitors messages received by the user of computer system 150, compares received messages to other pending messages 159 to identify messages with redundant contents, and manages the pending messages so that the user need not review the redundant contents. In some embodiments, the Message Receiver component manages identified messages with redundant contents by creating a new message that includes the unique contents of each of the identified messages but at most a single copy of the redundant contents. In these embodiments, the Message Receiver component can also indicate that the identified messages are redundant in light of the newly created message in a variety of ways, such as by deleting the identified messages or by altering the visual indicators of the identified messages presented to the user. In other embodiments, the identified messages with redundant contents are managed by deleting the redundant contents from the identified messages, or by altering the manner in which the redundant contents are presented to the user to allow for easy identification. The activities of the Message Receiver component 155 in managing messages with redundant contents are illustrated in greater detail below with respect to FIGS. 2A–2D.

The Message Presenter component 153 presents the currently pending messages to the user. The Message Presenter component can visually identify messages created or modified by the Message Receiver component (e.g., by highlighting the indicator for such messages when a list of all pending messages is shown or by visually identifying message contents that were modified), and can also visually identify pending messages that are redundant in light of the newly created message (e.g., by dimming the indicator for such messages).

In some embodiments, each recipient computer system sends messages directly to other recipient computer systems and similarly receives messages directly from other recipient computer systems. In alternate embodiments, one or more server computer systems can manage the distribution of electronic messages, such as by receiving a copy of a message to be distributed and by forwarding copies of the message to the various recipients of the message. Server computer system 100 illustrated in FIG. 1 is suitable for performing such a distribution role, and includes a CPU 110, a memory 130, and input/output devices 120. The memory 130 stores an executing copy of the Message Distributor component 134, which receives messages from recipient computer systems that are sending messages and distributes copies of the messages to the appropriate recipients. The input/output devices 120 of the server computer system 100 can include a storage device 126, a network connection 122, a computer-readable media drive 123, and a display 124, as well as other devices not shown.

In embodiments in which the Message Distributor component 134 distributes messages, each recipient computer system can have an individual Message Manager system 157 as described above, or the server computer system 100 could instead have one or more executing Message Manager systems 157 (not shown). In addition, if the Message Distributor component 134 distributes the messages, the server computer system 100. could store the pending stored messages 159 for each user (not shown) until the Message Presenter component 153 for that user requested the currently pending messages.

In embodiments in which one or more Message Manager systems 157 are executing at the server computer system 100 in conjunction with the Message Distributor component 134, the Message Manager systems 157 could process the messages to be sent to each user before the messages are actually distributed. In this manner, the recipient computer systems could avoid receiving messages with redundant contents. For example, if a message is received for a recipient by the server computer system 100, with the message having redundant contents in light of the recipient's pending messages, a newly created message could be formed that included only the unique contents of the received message. This new message could be forwarded to the user rather than the received message so that the recipient does not receive a message with redundant contents. Alternately, if the Message Distributor component 134 instead receives or stores two or more messages for a recipient having some common contents, a new message can be created which includes the unique contents of those messages and a single copy of the common contents. This new message could then replace those other messages, and be forwarded to the user at the appropriate time.

Those skilled in the art will appreciate that computer systems 100 and 150 are merely illustrative and are not intended to limit the scope of the present invention. The computer systems may contain additional components or may lack some illustrated components, and computer system 150 may send messages to or receive messages from any accessible device, including through a wireless network or wired network such as the Internet. Accordingly, the present invention may be practiced with other computer system configurations.

Figure 2B:
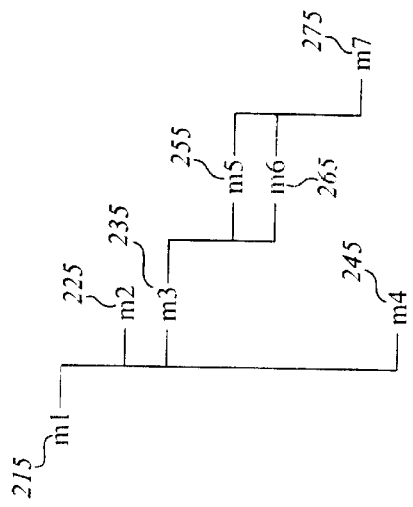
Figure 2A:
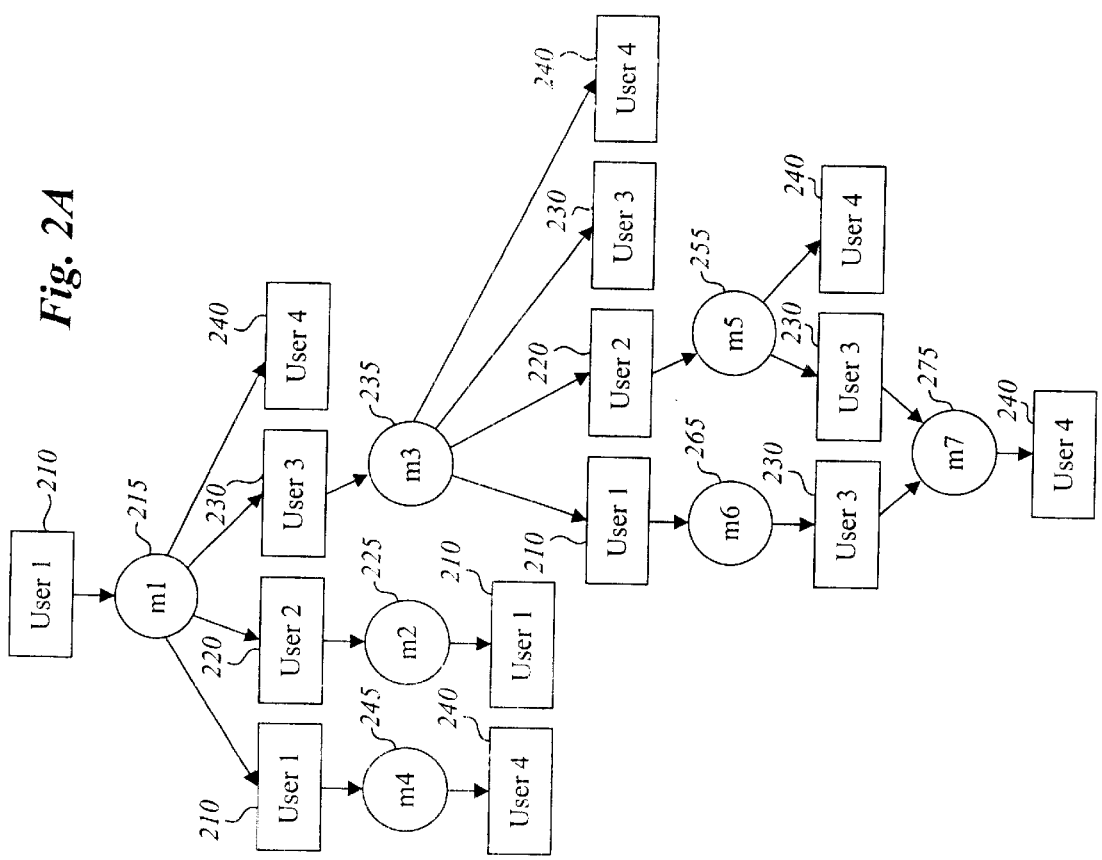

The activities of the Message Receiver component 155 in managing messages with redundant contents can be illustrated by way of example with respect to FIGS. 2A–2D. FIGS. 2A–2C illustrate various representations of a message thread consisting of several messages sent between four users. FIG. 2A illustrates the series of actions involved in creating the message thread, FIG. 2B illustrates the messages in a hierarchical fashion to show how the messages are related to each other, and FIG. 2C illustrates the messages received by each user. FIG. 2D illustrates the same messages as shown in FIG. 2C after the Message Manager system 157 of the present invention has identified messages with redundant contents, created a new message that includes the unique contents of each of the identified message and at most a single copy of the redundant contents, and deleted the identified messages.

As shown in FIG. 2A, the message thread begins when User 1 210 creates message M1 215 and sends copies to User 2 220, User 3 230, and User 4 240. User 1 also keeps a copy of message M1, either by explicitly identifying User 1 as a recipient or through an automated feature of the message sending program. At some point after receiving message M1, User 2 creates a reply message M2 225 which User 2 sends to User 1. In the illustrated embodiment, the contents of response messages include all the contents of the messages to which they are responding, and may also include message header information (e.g., the sender, recipients, message send time, and message subject) from the messages to which they are responding. Thus, message M2 includes the contents of message M1. While response message can include only the contents of the message to which they are responding without adding any additional contents, the response messages in this illustrated embodiment do include additional content information unique to the response message.

Similarly to User 2, User 3 creates message M3 235 in response to message M1, and sends message M3 to Users 1, 2, 3, and 4. At some point after sending message M1, User 1 realizes that User 4 should receive additional information related to message M1. Thus, User 1 creates a new message M4 245 by forwarding a copy of message M1 to User 4 along with additional new information. At some point after receiving message M3, User 1 responds by creating response message M6 265 and sending the message to User 3. Similarly, at some point after receiving message M3, User 2 creates response message M5 255 and sends the message to Users 3 and 4. Finally, after receiving both messages M6 and M5, User 3 creates message M7 275 as a response to both messages, and sends the message to User 4. Thus, messages M1–M7 are all part of the same message thread.

FIG. 2B illustrates the messages in the message thread in a hierarchical fashion to show how the messages are related to each other. Thus, FIG. 2B illustrates that message M1 is the head (or "root") of the message thread, and that messages M2, M3, and M4 are responses to (or "children" of) message M1. Messages M2, M3, and M4 are referred to as sibling messages because they are children of the same message, and message M1 is referred to as a parent of the messages. As is further illustrated by the message hierarchy, messages M5 and M6 are responses to message M3, and message M7 is a response to both messages M5 and M6. Message M7 can also be described as a "descendant" of each of the messages M5, M6, M3, and M1, and each of the messages M5, M6, M3, and M1 can similarly be described as "ancestors" of message M7.

FIG. 2C illustrates the messages in the message thread by showing the messages received by each user. If the users have not received any other messages and have not deleted any of these messages that they received, then these messages will reflect their currently pending messages. Thus, User 1 first received message M1 followed by messages M2 and M3. In FIGS. 2C and 2D, relationships between messages are shown by information in parentheses following the message. Thus, since message M1 was not a response to any other message, no information is shown in parentheses following that message. Conversely, since messages M2 and M3 were each responses to message M1, message M1 is shown in parentheses following each of those messages. As a reminder, in the illustrated embodiment each response message will include in its contents the contents of the messages to which it is responding. Thus, the contents of a message will include the contents of the related messages shown in parentheses following the message.

In a similar manner to that shown for User 1, User 2 first received message M1 and then received message M3. User 3 also received message M1, followed by messages M3, M5, and M6. As is shown by the information in the parentheses following messages M5 and M6, both messages are responses to message M3 and thus include the contents of message M3. While neither message M5 or M6 are direct responses to message M1, the contents of message M1 are included in both messages indirectly since message M1 is an ancestor and the M1 contents are present in the contents of message M3. This is illustrated graphically by showing message M1 separated from message M3 by a colon in the parentheses. User 4 similarly received messages M1, M3, M4, M5, and M7.

FIG. 2D illustrates the same messages as shown in FIG. 2C after the Message Manager system 157 of the present invention has identified messages with redundant contents, created a new message that includes the unique contents of each of the identified message and at most a single copy of the redundant contents, and deleted the identified messages. Those skilled in the art will appreciate that a variety of actions can be taken for identified messages with redundant contents other than deleting them. For example, if the pending messages are stored in a default message folder (e.g., the Inbox folder), the messages with redundant contents could be moved to a different folder. Alternately, the messages with redundant contents could be left in the Inbox folder but could be differentiated from the other pending messages, such as by displaying the messages with redundant contents in a distinct manner (e.g., dimmed) or by changing the urgency or priority of those messages. In yet another embodiment, the Message Manager system 157 could recommend one or more actions be taken with messages with redundant contents, but could solicit user input as confirmation of the action before it is performed or to reverse a default action that was already performed.

In order to delete or otherwise indicate the messages with redundant contents, the Message Manager system 157 first identifies for each user the pending messages for that user that have redundant contents. In the illustrated embodiment, message contents are determined to be redundant if those contents are included in the contents of another pending message for the user. In some situations, such as when a recipient has both a copy of a message and a copy of a response to the message, one pending message will include the complete contents of another pending message. In some embodiments, such messages will be managed by deleting the message whose contents are completely included in another message. In alternate embodiments, such messages will not be managed, and messages with redundant contents will be managed only when there is not a complete overlap in the message contents (i.e., when each message has unique contents as well as common contents).

Thus, as shown in FIG. 2D, messages M2 and M3 for user 1 have been replaced with a new message M8φ. In this illustrated embodiment, new messages created by the Message Manager system will be indicated with an "φ". Also, for exemplary purposes, messages for user 1 with redundant contents will be managed only when there is not a complete overlap in the message contents. Thus, as is shown, message M8φ includes the unique contents of both messages M2 and M3, but does not include the message M1 contents because message M1 is still pending. If message M1 had not been pending, message M8φ would also have included a single copy of the message M1 contents (that are present in the contents of both messages M2 and M3). As discussed above, in alternate embodiments the Message Manager would have treated message M1 as a message with redundant contents to be managed, and would thus have deleted message M1 and included a single copy of the message M1 contents in message M8φ.

For users 2, 3, and 4, messages with redundant contents are managed even if there is a complete overlap in the message contents. Thus, for user 2 the Message Manager system identifies the contents of message M1 as being redundant in light of message M3. Since the Message Manager system can remove these redundant contents for user 2 merely by deleting message M1, it is not necessary to create a new message.

For both users 3 and 4, all of the pending messages for the user are identified by the Message Manager system as sharing redundant contents (for both users, all pending messages include the contents of message M1). Thus, for user 3 a new message M9φ is created that includes the contents of message M1, and the unique contents from each of messages M6, M5, and M3. The actual creation of message M9φ can be performed in a variety of ways. For example, one of the pending messages such as message M6 can be first selected. All of the contents of that first message can then be added to message M9φ. Each of the other pending messages can then be selected in turn. For each selected message, the portion of that message contents which are not already present in message M9φ are then added to message M9φ. If message M6 is the first message chosen, then nothing will be added to message M9φ when either message M1 or M3 is selected since message M6 included the contents of both messages (messages M1 and M3 are both ancestors of message M6). However, the unique portion of the message M5 contents will be added to message M9φ. As is shown in the parentheses following message M9φ in FIG. 2D, message M9φ was constructed in the exemplary manner described above.

In a similar manner to that for user 3, the Message Manager creates a new message M10φ for user 4 that includes the unique contents from each of the messages M7, M5, M4, M3, and M1. Using an alternate manner of constructing message M10φ from that described for user 3, the Message Manager selects each of the pending messages in their order of creation, starting with the earliest message first. Thus, the Message Manager first selects message M1, and adds to message M10φ all of the contents of message M1 which are not yet included in message M10φ (which are all of the message M1 contents). The same procedure is used for each of the pending messages M3, M4, M5, and M7 in turn. The parentheses following message M10φ in FIG. 2D indicate that this order of messages was used. Those skilled in the art will appreciate that various other methods of constructing such new messages can be used.

Figure 3:
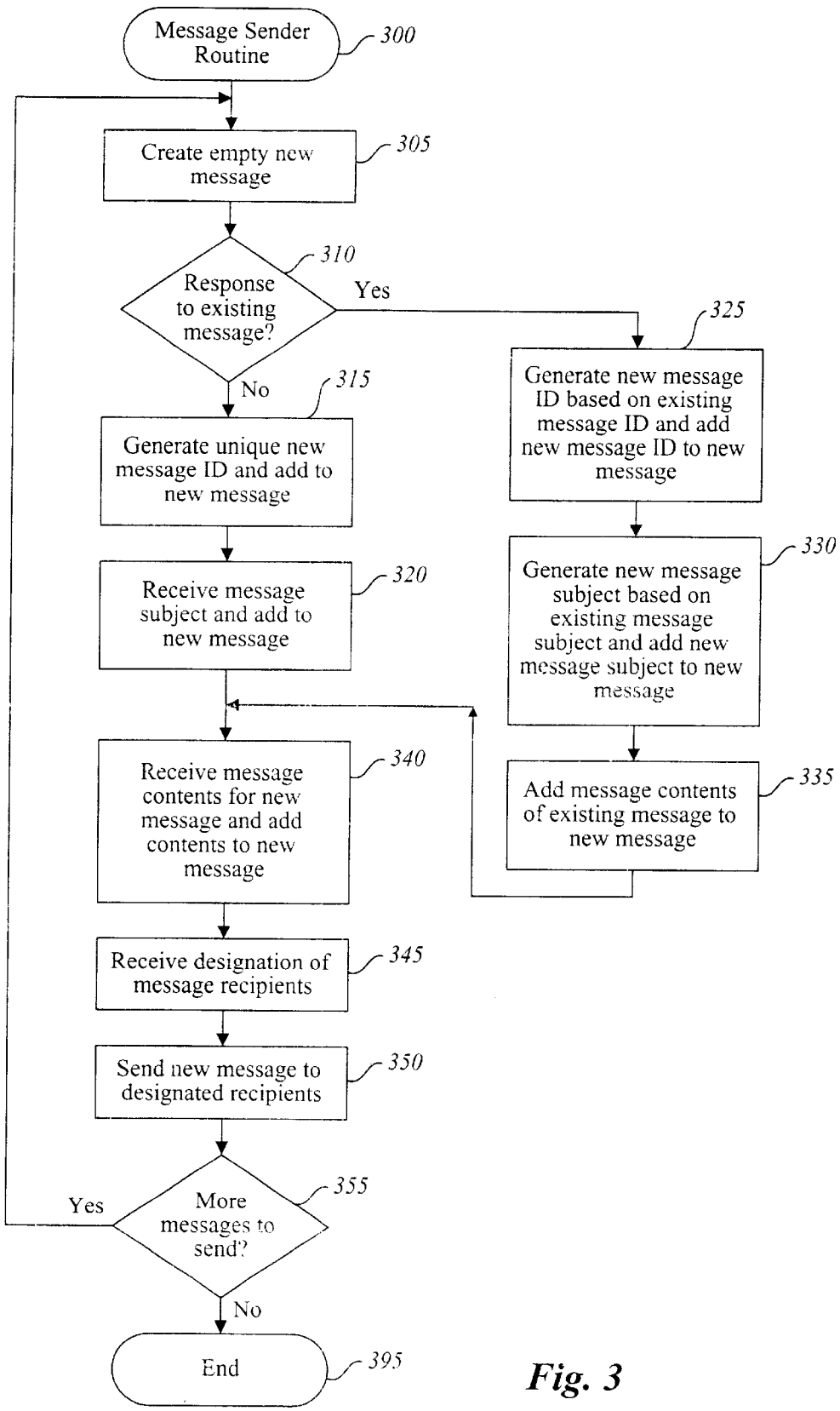
FIG. 3 is an exemplary flow diagram of an embodiment of the Message Sender routine.

FIG. 3 is an exemplary flow diagram of an embodiment of the Message Sender 154 routine 300. The routine allows a user to create a new message and to send the message to one or more recipients. If the new message to be sent is not part of an existing message thread (i.e., is not a response to an existing message), the user specifies a message subject and the message contents for the message. In addition, a unique message ID is assigned to the message before it is sent. If the new message to be sent is instead a response to an existing message, the contents of the existing message are included in the new message, the subject for the new message is generated based on the subject of the existing message, and a unique message ID for the new message is generated based on the message ID for the existing message.

The Message Sender routine begins at step 305 where a new empty message is created. The routine continues to step 310 to determine if the new message will be a response to an existing message. If not, the routine continues to step 315 to generate a unique message ID, and assigns the new message ID to the new message. The routine then continues to step 320 to receive the message subject from the user, and to add the message subject to the message.

If it was instead determined in step 310 that the new message is to be a response to an existing message, the routine instead continues to step 325 to generate a unique message ID based on the message ID for the existing message being responded to. The generated message ID is then added to the new message. Those skilled in the art will appreciate that a wide variety of relationships between IDs can be used to indicate response relationships. For example, referring to the messages shown in FIG. 2B, message M1 may have received the unique ID 1234. When messages M2, M3, and M4 are created in response to message M1, the unique IDs assigned to each of the response messages can show that relationship to message M1 (e.g., with the IDs 1234-01, 1234-02, and 1234-03 respectively). Similarly, the IDs for messages M5 and M6 can show their relationship to messages M3 and M1 (e.g., with the IDs 1234-02-01 and 1234-02-02 respectively). A related ID can be generated based on an existing ID in any manner that is later discernible.

After step 325, the routine continues to step 330 to generate a new message subject based on the message subject for the existing message, and adds the new message subject to the new message. Those skilled in the art will appreciate that a wide variety of relationships between message subjects can be used to indicate response relationships. For example, referring to the messages shown in FIG. 2B, message M1 may have the subject "XYZ project." When messages M2, M3, and M4 are created in response to message M1, the subjects assigned to each of the response messages may show that relationship to message M1 (e.g., with message subjects "RE: XYZ project-01,"" RE: XYZ project-02" and "RE: XYZ project-03" respectively, or with message subject "RE: XYZ project" for each message). Similarly, the subject for message M5 can show its relationship to messages M3 and M1 (e.g., with message subject "RE: RE: XYZ project-02-01"). A related message subject can be generated based on an existing message subject in any manner that is later discernible.

After step 330, the routine then continues to step 335 to add the message contents of the existing message to the new message. In the illustrated embodiment, the message contents of the message being responded to are automatically added to the contents of the response message. In alternate embodiments, the user may indicate whether to add the message contents of the message being responded to, or the new message may merely contain a link or a pointer to the message being responded to.

After steps 335 or 320, the routine continues to step 340 to receive from the user the message contents for the new message, and adds the new contents to the new message. Those skilled in the art will appreciate that the message contents can include a wide variety of information types such as text, graphics, audio or video clips, attached documents, etc. Alternately, no new message contents may be added to a new message. The routine next continues to step 345 to receive from the user a designation of the message recipients. The routine then continues to step 350 and sends the new message to the designated recipients. In step 355, the routine determines if there are more messages to send. If so, the routine returns to step 305, and if not the routine ends at step 395.

Those skilled in the art will appreciate that new messages can be created in a variety of ways. For example, new messages may not be each assigned a unique ID. Alternately, a response message may have an ID or subject that is independent of the ID and subject of the message being responded to, and response messages may include only some or none of the contents of the message being responded to. In addition, the contents and recipients of the new message can be generated automatically rather than being received from the user. For example, a reply message may automatically select the sender of the message being responded to as the recipient of the new message.

Figure 4:
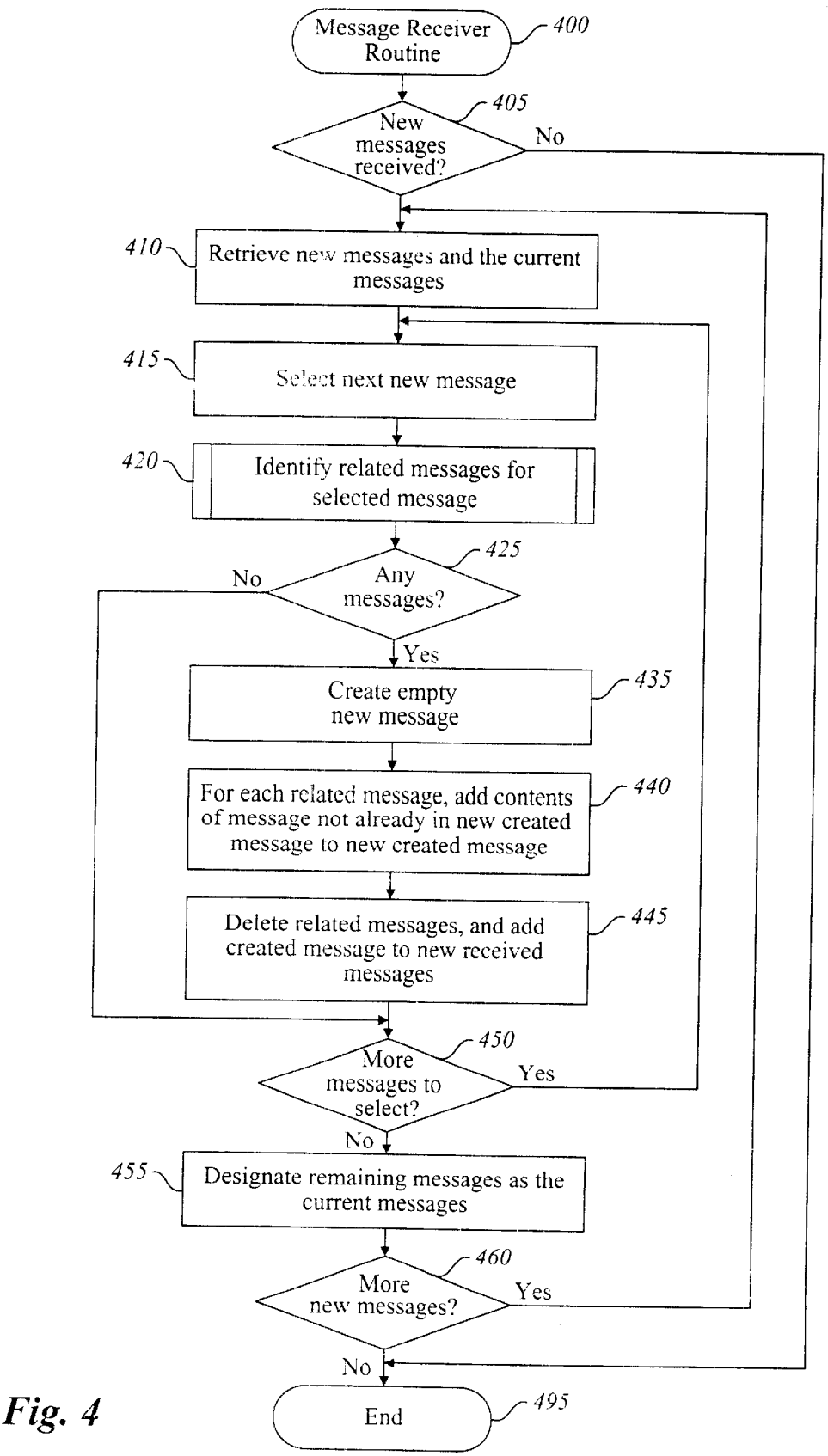
FIG. 4 is an exemplary flow diagram of an embodiment of the Message Receiver routine.

FIG. 4 is an exemplary flow diagram of an embodiment of the Message Receiver 155 routine 400. The routine receives messages sent to a user, and before the messages are made available to the user the routine determines if any of the pending or new messages have redundant contents in light of other pending or new messages. If any of the pending or new messages are identified as having such redundant contents, the routine creates a new message that includes the unique contents of the identified messages as well as at most one copy of the redundant contents, and then deletes the identified messages.

The routine begins at step 405 where it checks if any new messages have been received. If so, the routine continues to step 410 to retrieve the new messages as well as any currently pending messages. The routine then continues to step 415 to select the next retrieved message, beginning with the first message. In step 420, the routine identifies any messages among the retrieved messages that have redundant contents in light of the selected message by executing subroutine 420. After identifying any messages with redundant contents, the routine continues to step 425 to determine if any such messages were identified.

If any related messages were identified that have redundant contents, the routine continues to step 435 to create a new empty message. Those skilled in the art will appreciate that the message can be created in a manner similar to that described for a response, message with respect to FIG. 3, thus automatically generating a message subject and message ID that is related to the identified messages. Alternately, the new message could have a message subject or other identifying indicia to show that the message was automatically generated (e.g., appending an 'φ' to the message name). The routine next continues to step 440 where, for each identified related message, the contents of that message not already present in the new message are added to the new message. The routine then continues to step 445 to delete the identified related messages (including the selected message), and to add the newly created message to the list of new retrieved messages.

After step 445, or if was instead determined in step 425 that there were not any messages related to the selected message, the routine continues to step 450 to determine if there are more new retrieved or currently pending messages to select. If so, the routine returns to step 415, and if not the routine continues to step 455 to designate the remaining messages as the currently pending messages. This can be done in a variety of ways, such as by storing the remaining messages locally or by notifying another component to store only the new group of pending messages. Alternately, if the pending messages are stored or presented in a default location (e.g., the Inbox Folder), the non-pending messages could be removed from this default location. After step 455, the routine continues to step 460 to determine if there are more new messages to receive. If so, the routine returns to step 410, and if not the routine ends at step 495.

Those skilled in the art will appreciate that messages with redundant contents can be managed in a variety of ways. For example, such messages could be indicated as being redundant in light of the newly created message in ways other than being deleted. In addition, messages could be presented to the user when first received, and only processed for redundant contents on a periodic basis or when directed by the user. Moreover, user confirmation could be required before deleting any message identified as having redundant contents, or before deleting a currently pending message that the user may have already reviewed.

Figure 5:
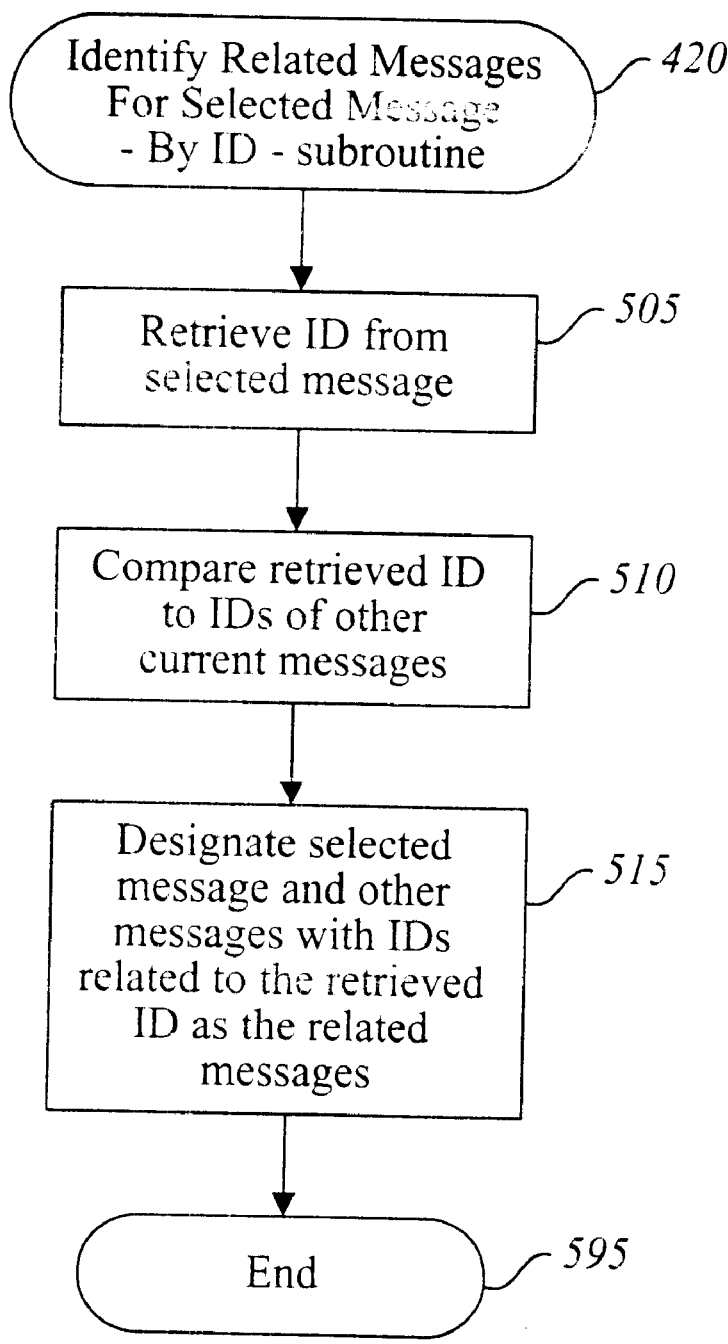
FIG. 5 is an exemplary flow diagram of an embodiment of the Identify Related Messages For Selected Message—By ID subroutine.
Figure 6:
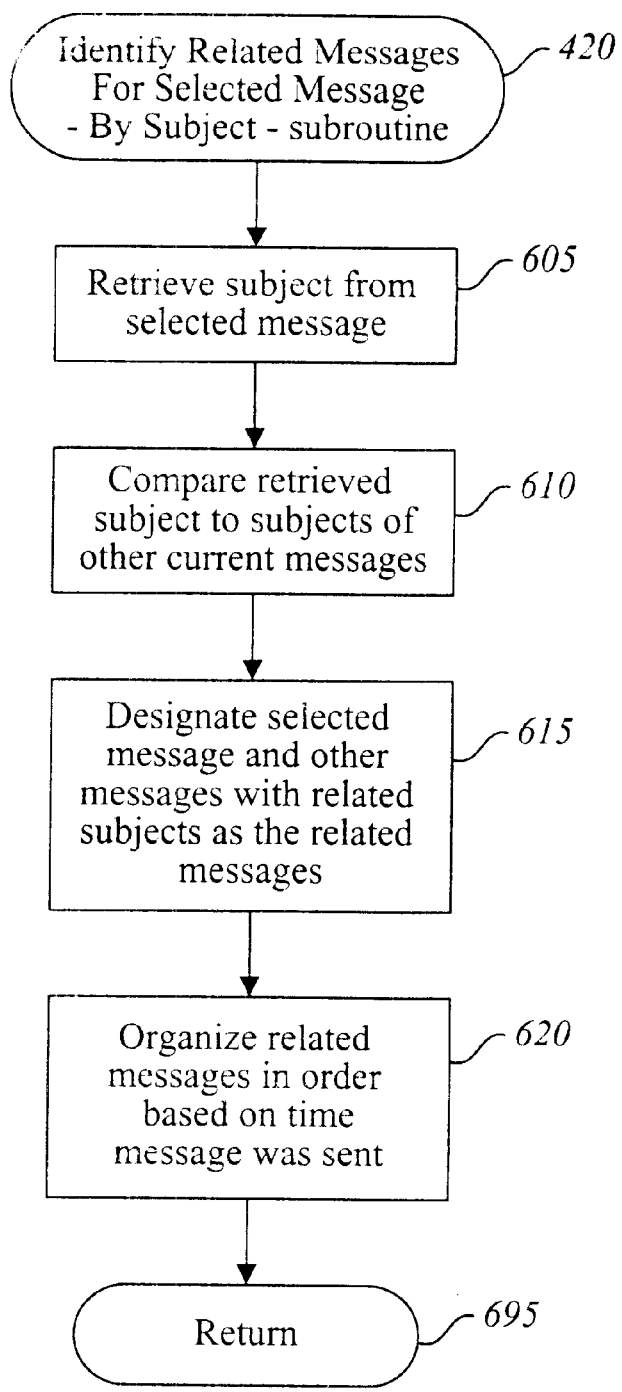
FIG. 6 is an exemplary flow diagram of an embodiment of the Identify Related Messages For Selected Message—By Subject subroutine.
Figure 7:
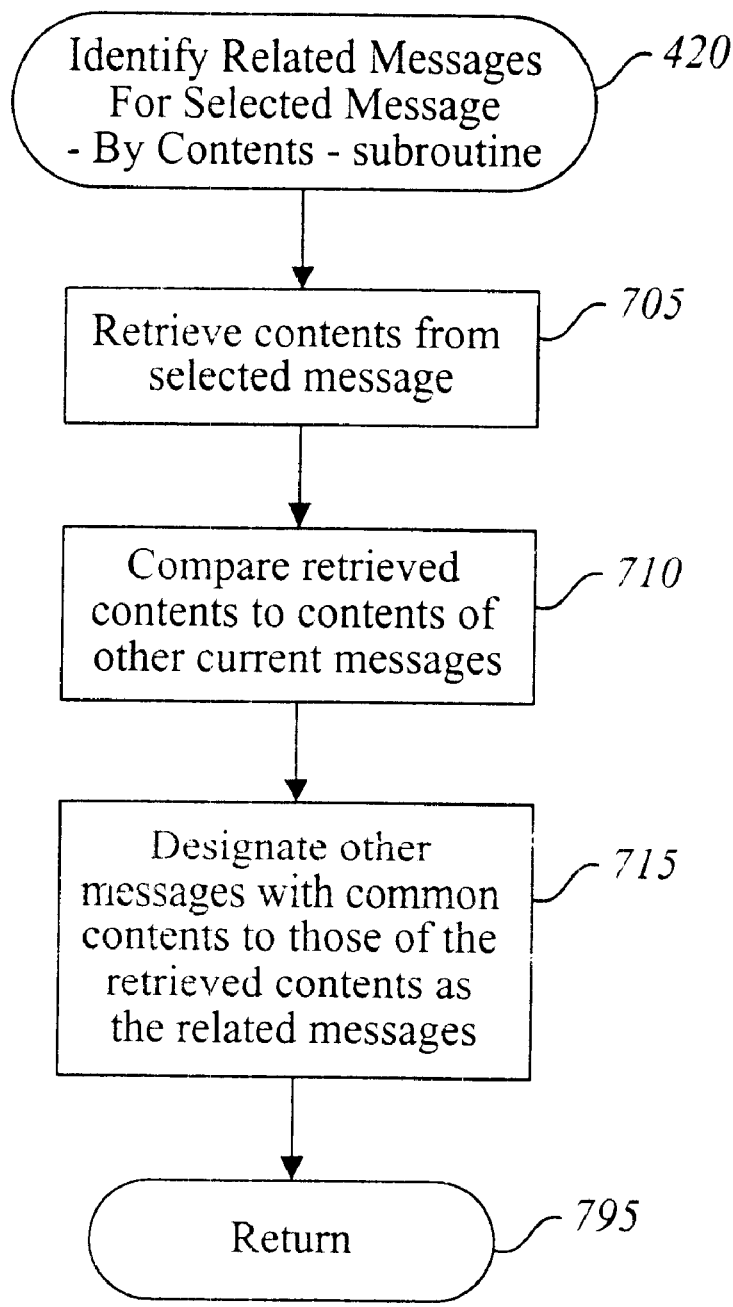
FIG. 7 is an exemplary flow diagram of an embodiment of the Identify Related Messages For Selected Message—By Contents subroutine.

FIGS. 5, 6, and 7 illustrate three alternate embodiments of the Identify Related Messages For Selected Message subroutine 420. FIG. 5 describes an embodiment of subroutine 420 in which message IDs are used to identify related messages with redundant contents. FIG. 6 describes an embodiment of subroutine 420 in which message subjects and message send times are used to identify related messages with redundant contents. FIG. 7 describes an embodiment of subroutine 420 in which message contents are used to identify related messages with redundant contents. Those skilled in the art will appreciate that other methods can also be used to identify such messages.

FIG. 5 is an exemplary flow diagram of an alternate embodiment of subroutine 420 in which message IDs are used to identify related messages with redundant contents. In this embodiment, all of the messages in a message thread have related IDs, and the relationships among IDs indicate which messages are responses to which other messages. Exemplary related message IDs for the messages shown in FIG. 2B are discussed above with respect to FIG. 3. Those skilled in the art will appreciate that a wide variety of relationships between IDs can be used to indicate response relationships.

The subroutine for FIG. 5 begins at step 505 where the ID for the selected message is retrieved. The subroutine continues to step 510 where the retrieved ID is compared to the IDs of the other current retrieved messages in order to identify related messages. This comparison can identify not only messages which are responses to the selected message, but also sibling or other messages that share a common ancestor with the selected message. Since response messages in the illustrated embodiment include the contents of the messages being responded to, any sibling or other messages that share a common with subject "RE: XYZ project-02". In this manner, message M1 can be identified as being related to message M5 even if message M3 is not currently pending. In a similar manner, sibling or other messages that share a common ancestor with the selected message can also be identified based on their subjects.

Those skilled in the art will appreciate that in some embodiments, each message will have a unique message subject that allows the relationships for that message to be precisely defined. For example, if messages M2, M3 and M4 all have unique message subjects (e.g., "RE: XYZ project-01," "RE: XYZ project-02" and "RE: XYZ project-03" respectively), then message M5 (e.g., with message subject "RE: RE: XYZ project-02-01") may be identifiable as being related to message M3 rather than M2 or M4. Conversely, if messages M2, M3 and M4 all share the same message subject "RE: XYZ project," then a message subject for message M5 such as "RE: RE: XYZ project" would not directly indicate which of the messages M2, M3 or M4 that message MS had responded to. Nonetheless, even if messages M2, M3 and M4 all share the same message subject "RE: XYZ project," it is still possible to determine that the messages share a common ancestor.

In this illustrated embodiment of FIG. 6, response messages have the same message subject as the message to which they are responding, and thus message subjects are not guaranteed to be unique. After step 610, the subroutine continues to step 615 to designate the selected message and any other messages with the same message subject as being related. This group will include any current retrieved messages in the response chain before or after the selected message (e.g., message M1 to M3 to M5 to M7), as well as any other messages that share a common ancestor (e.g., message M2 and M4) with the selected message.

The subroutine then continues to step 620 to organize the related messages in order based on the time that the messages were sent. In this manner, the newly created message will include the unique contents of each of the related messages in the order that the contents were generated. This will assist a reviewer of the new message to more easily appreciate how the series of messages in the message thread developed over time. After step 620, the subroutine continues to step 695 and returns. Those skilled in the art will appreciate that subjects alone can be used to identify messages with redundant contents without using message send times, and that message send times can be used in conjunction with other message relation identifiers such as IDs and message contents in order to ensure that the newly created message has an appropriate series of contents that reflects how the related messages were created.

FIG. 7 is an exemplary flow diagram of an alternate embodiment of subroutine 420 in which message contents are used to identify related messages with redundant contents. In this embodiment, all of the messages in a message thread have related contents because each response message includes the contents of the message being responded to. Those skilled in the art will appreciate that in other embodiments, none or only some of the contents of the message being responded to may be included in response messages.

The subroutine for FIG. 7 begins at step 705 where the contents for the selected message are retrieved. The subroutine continues to step 710 where the retrieved contents are compared to the contents of the other currently pending messages. This comparison identifies messages whose contents are included in the selected message and messages which include the contents of the selected message. In addition, sibling and other messages with a common ancestor will be identified as sharing at least a portion of their contents with a portion of the selected message's contents. The subroutine then continues to step 715 to designate the identified messages as related. After step 715, the subroutine returns at step 795.

Figure 8:
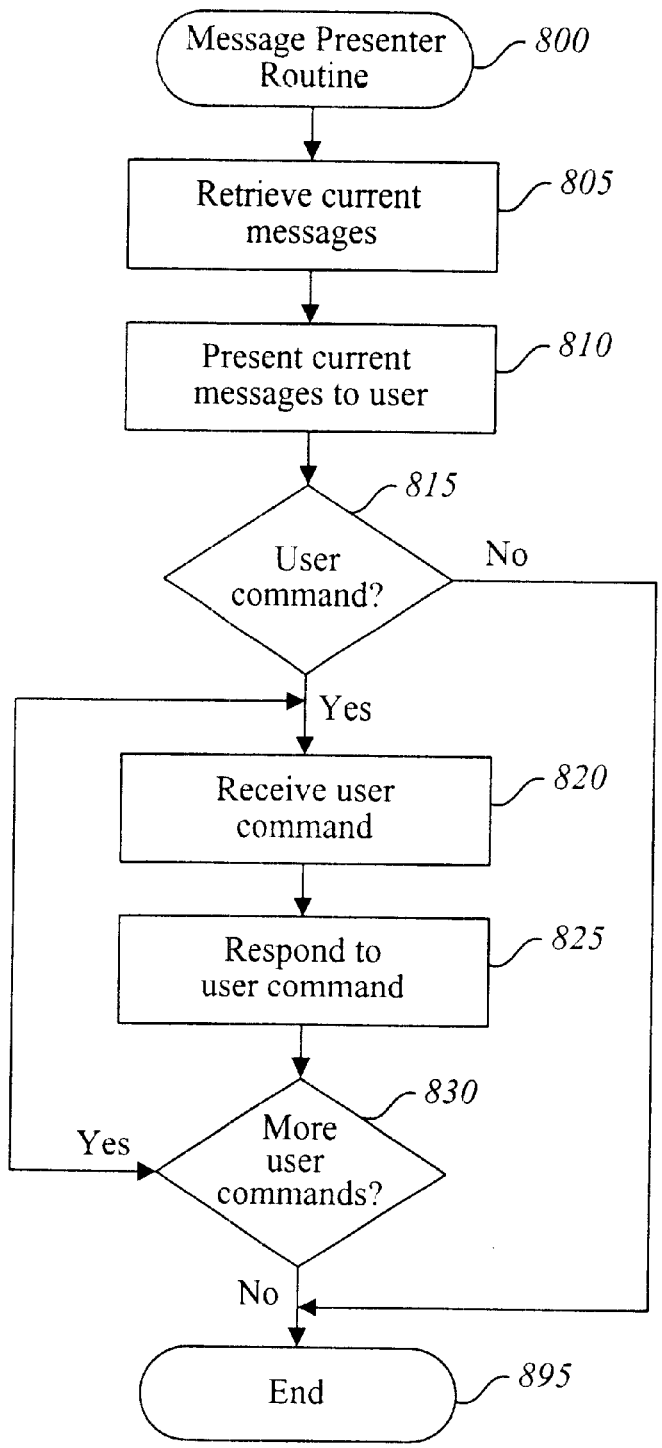
FIG. 8 is an exemplary flow diagram of an embodiment of the Message Presenter routine.

FIG. 8 is an exemplary flow diagram of an embodiment of the Message Presenter 153 routine 800. The Message Presenter routine presents the currently pending message to the user to allow the user to review or respond to the messages. The routine begins at step 805 where the currently pending messages are retrieved. The routine then continues to step 810 where the currently pending messages are presented to the user. In the illustrated embodiment, messages with redundant contents have been eliminated from the group of pending messages by deleting the messages, and any newly created messages will be included in the pending messages. In other embodiments, however, messages with redundant contents can be identified in other manners, such as by having the Message Presenter routine display those messages or indicators for those messages in an altered fashion (e.g., dimmed) or by displaying those messages in a folder other than the default folder.

After step 810, the routine continues to 815 to determine if any user commands have been received. If so, the routine continues to step 820 to receive the user command, and then to step 825 to respond to the user command. The routine then continues to step 830 to determine if there are more user commands. If so, the routine returns to step 820. If it is instead determined in step 830 that there are no more user commands or in step 815 that there were not any user commands, the routine continues to step 895 and ends.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer-implemented method for automatically generating an electronic mail message from electronic mail messages that are part of a mail message thread, the method comprising:

receiving a first electronic mail message with first contents, the first electronic mail message sent to a user;

receiving a second electronic mail message with second contents, the second electronic mail message sent to the user, the second electronic mail message part of a mail message thread including a plurality of electronic mail messages;

in response to receiving the second electronic mail message, determining whether the first electronic mail message is part of the mail message thread that includes the second electronic mail message;

when the first electronic mail message is determined to be part of the mail message thread that includes the second electronic mail message, determining whether the second contents and the first contents each contain contents of a third electronic mail message; and when the second contents and the first contents are determined to each contain the contents of the third electronic mail message, automatically removing redundant mail message contents by generating a new electronic mail message having contents that include portions of the first contents other than the contents of the third electronic mail message, portions of the second contents other than the contents of the third electronic mail message, and a single copy of the contents of the third electronic mail message; and deleting the first and second electronic mail messages.

2. The method of claim 1 wherein the first electronic mail message has a first subject separate from the first contents, wherein the second electronic mail message has a second subject separate from the second contents, and wherein the first electronic mail message is determined to be part of the mail message thread that includes the second electronic mail message when the second subject includes the first subject.

3. The method of claim 1 wherein the generating of the new electronic mail message is performed only if the first and second contents are distinct.

4. The method of claim 1 wherein the first electronic mail message has a first identifier separate from the first contents, wherein the second electronic mail message has a second identifier separate from the second contents, and wherein the first electronic mail message is determined to be part of the mail message thread that includes the second electronic mail message when the second identifier is based on the first identifier.

5. The method of claim 1 wherein the generating of the electronic mail message includes:
   creating a new electronic mail message;
   copying all of the first contents into the created electronic mail message; and
   copying only the portions of the second contents that are distinct from the first contents into the created electronic mail message.

6. The method of claim 5 wherein the user is not notified of the receiving of the first and second electronic mail messages until after either the first electronic mail message is determined to not be part of the mail message thread that includes the second electronic mail message or the second contents and the first contents are determined to not each contain the contents of the third electronic mail message.

7. A computer-implemented method for managing electronic messages sent to a user, the method comprising:
   receiving an indication of a plurality of electronic messages sent to the user;
   determining at least two of the plurality of electronic messages whose contents each include the contents of another electronic message; and
   generating an electronic message containing the contents of the determined electronic messages in such a manner that the generated electronic message contains a single copy of the contents of the another electronic message.

8. The method of claim 7 including deleting the determined electronic messages after the generating of the electronic message.

9. The method of claim 7 wherein a default visual appearance is used when displaying to the user indicators for the plurality of electronic messages, and including changing the visual appearance of the indicators for the determined electronic messages after the generating of the electronic message.

10. The method of claim 7 wherein the plurality of electronic messages are stored in one location, and including:
    storing the generated electronic message in the one location; and
    moving the determined electronic messages to another location.

11. The method of claim 7 wherein each of the plurality of electronic messages has a subject, and wherein the determining of the at least two of the plurality of electronic messages includes determining that the subjects of the determined electronic messages are related.

12. The method of claim 7 wherein the determined electronic messages and the another electronic message each have a subject, and wherein the determining of the at least two of the plurality of electronic messages includes determining that the subjects of the determined electronic messages are related to the subject of the another electronic message.

13. The method of claim 7 wherein each of the plurality of electronic messages has a unique identifier, and wherein the determining of the at least two of the plurality of electronic messages includes determining that the identifiers of the determined electronic messages are related.

14. The method of claim 7 wherein the determining of the at least two of the plurality of electronic messages includes comparing the contents of one of the determined electronic messages to other determined electronic messages.

15. The method of claim 7 wherein each of the plurality of electronic messages has header information separate from the contents of the message, and wherein the header information of the another electronic message is not included in the contents of the determined electronic messages.

16. The method of claim 7 wherein the generating of the electronic message includes:
    creating an electronic mail message;
    for a first of the determined electronic messages, copying into the created electronic mail message all of the contents of the first determined electronic message; and
    for each of the other determined electronic messages, copying into the created electronic mail message the portions of the contents of the determined electronic message that not yet present in the created electronic mail message.

17. The method of claim 16 wherein each of the determined electronic messages has an associated time when the electronic message was sent, and wherein the generating of the electronic message includes selecting based on the associated times an order for the determined electronic messages such that the copying of the contents of the determined electronic messages is performed based on the selected order.

18. A computer-implemented method for managing electronic messages sent to a user, the user having a plurality of received pending electronic messages, each received electronic message comprising a message header and message information, the method comprising:
   receiving an indication of an electronic message sent to the user, the message information for the indicated electronic message containing the message information of another electronic message;
   determining whether the message information for at least one of the pending electronic messages contains the message information for the another electronic message; and
   when it is determined that the message information for at least one of the pending electronic messages contains the message information for the another electronic message,
     automatically creating a new electronic message containing the message information of the indicated electronic message and of the pending electronic messages that contain the message information for the another electronic message, the creating in such a manner that the created electronic message contains only a single copy of the message information of the another electronic message; and
     indicating that the pending electronic messages that contain the message information for the another electronic message are no longer pending.

19. The method of claim 18 wherein the indicating that the pending electronic messages that contain the message information for the another electronic message are no longer pending includes deleting those pending electronic messages.

20. The method of claim 18 wherein the message header for each of the plurality of electronic messages includes a message subject, and wherein the determining of whether the message information for at least one of the pending electronic messages contains the message information for the another electronic message includes comparing the message subject of the indicated electronic message to the message subjects of the pending electronic messages.

21. The method of claim 18 wherein the determining of whether the message information for at least one of the pending electronic messages contains the message information for the another electronic message includes comparing the message information of the indicated electronic message to the message information of the pending electronic messages.

22. The method of claim 18 wherein the step of indicating that the pending electronic messages that contain the message information for the another electronic message are no longer pending is performed only if those pending electronic messages have not been reviewed by the user.

23. The method of claim 18 wherein the step of indicating that the pending electronic messages that contain the message information for the another electronic message are no longer pending is not performed if the user has previously indicated that those pending electronic messages remain pending.

24. The method of claim 18 wherein the step of indicating that the pending electronic messages that contain the message information for the another electronic message are no longer pending comprises:
   querying the user as to whether those pending electronic messages should be pending; and
   when the user directs that those pending electronic messages should not be pending, fulfilling the directions of the user.

25. A computer-implemented method for managing electronic messages each having message contents, the method comprising:
   receiving an indication of a first electronic message sent by a user, the contents of the first electronic message including the contents of a second electronic message; and
   when a copy of the first electronic message is retained for the user, determining whether contents of a third electronic message retained for the user includes the contents of the second electronic message; and
   when the contents of the third electronic message includes the contents of the second electronic message, automatically creating a fourth electronic message containing the contents of the first and third electronic messages, the creating in such a manner that the fourth electronic message contains only a single copy of the contents of the second electronic message.

26. The method of claim 25 including when the fourth electronic message is automatically created, deleting the first and third electronic messages.

27. The method of claim 25 wherein a default visual appearance is used when displaying indicators for electronic messages to the user, and including when the fourth electronic message is automatically created, changing the visual appearance of the indicators for the first and third electronic messages.

28. The method of claim 25 wherein electronic messages received or retained by the user are initially stored in one location, and including when the fourth electronic message is automatically created, moving the first and third electronic messages to another location.

29. The method of claim 25 wherein the determining of whether contents of the third electronic message includes the contents of the second electronic message includes comparing subjects of the first and third electronic messages.

30. The method of claim 25 wherein the determining of whether contents of the third electronic message includes the contents of the second electronic message includes comparing the contents of the first electronic message to the contents of the third electronic message.

31. A computer-readable medium whose contents cause a computer system to manage electronic messages sent to a user by:
   receiving an indication of a plurality of electronic messages sent to the user;
   determining at least two of the plurality of electronic messages whose contents each include the contents of another electronic message; and
   generating an electronic message containing the contents of the determined electronic messages, the generating in such a manner that the generated electronic message contains a single copy of the contents of the another electronic message.

32. The computer-readable medium of claim 31 wherein the contents of the computer-readable medium further cause the computer system to delete the determined electronic messages after the generating of the electronic message.

33. The computer-readable medium of claim 31 wherein the plurality of electronic messages are stored in one location, and wherein the contents of the computer-readable medium further cause the computer system to store the generated electronic message in the one location and to move the determined electronic messages to another location.

34. The computer-readable medium of claim 31 wherein each of the plurality of electronic messages has a subject, and wherein the determining of the at least two of the plurality of electronic messages includes determining that the subjects of the determined electronic messages are related.

35. The computer-readable medium of claim 31 wherein the determining of the at least two of the plurality of electronic messages includes comparing the contents of one of the determined electronic messages to other determined electronic messages.

36. The computer-readable medium of claim 31 wherein the generating of the electronic message includes:
   creating an electronic mail message;
   for a first of the determined electronic messages, copying into the created electronic mail message all of the contents of the first determined electronic message; and
   for each of the other determined electronic messages, copying into the created electronic mail message the portions of the contents of the determined electronic message that not yet present in the created electronic mail message.

37. The computer-readable medium of claim 36 wherein each of the determined electronic messages has an associated time when the electronic message was sent, and wherein the generating of the electronic message includes selecting based on the associated times an order for the determined electronic messages such that the copying of the contents of the determined electronic messages is performed based on the selected order.

38. The computer-readable medium of claim 31 wherein the determining of the at least two of the plurality of electronic messages includes determining that the at least two electronic messages are part of a shared message thread.

39. A computer system for managing electronic messages sent to a user, the computer system comprising:
  a network connection that allows communication with other computer systems; and
  a message receiver that receives via the network connection an indication of a plurality of electronic messages sent to the user, that determines at least two of the plurality of electronic messages whose contents each include the contents of another electronic message, and that generates an electronic message containing the contents of the determined electronic messages in such a manner that message contains a single copy of the contents of the another electronic message.

40. The computer system of claim 39 further comprising a message sender that composes a response message to an indicated message in such a manner that a relationship is indicated between the response message and the indicated message.

41. The computer system of claim 40 wherein the relationship between the response message and the indicated message is indicated by including the contents of the indicated message in the contents of the response message.

42. The computer system of claim 39 wherein the message receiver further deletes the determined electronic messages after the generating of the electronic message.

43. The computer system of claim 39 further comprising a storage device with a default location for storing the plurality of electronic messages, and wherein the message receiver further moves the determined electronic messages from the default location to another location after the generating of the electronic message.

44. The computer system of claim 39 further comprising a message presenter that presents to the user only electronic messages that do not include the contents of another electronic message such that the contents of the another electronic message are also included in other electronic messages to be presented to the user.

45. The computer system of claim 39 wherein each of the plurality of electronic messages has a subject, and wherein the determining of the at least two of the plurality of electronic messages includes determining that the subjects of the determined electronic messages are related.

46. The computer system of claim 39 wherein the determining of the at least two of the plurality of electronic messages includes comparing the contents of one of the determined electronic messages to other determined electronic messages.

47. The computer system of claim 39 wherein the message receiver generates the electronic message by:
  creating an electronic mail message;
  for a first of the determined electronic messages, copying into the created electronic mail message all of the contents of the first determined electronic message; and
  for each of the other determined electronic messages, copying into the created electronic mail message the portions of the contents of the determined electronic message that not yet present in the created electronic mail message.

48. The computer system of claim 39 wherein the determining of the at least two of the plurality of electronic messages includes determining that the at least two electronic messages are part of a shared, message thread.

49. A computer-readable medium containing an automatically generated electronic message based on at least two other electronic messages whose contents each include the contents of another electronic message, the automatically generated electronic message containing a single copy of the contents of the another electronic message and containing portions of the contents of each of the at least two other electronic messages, the contained portions of the contents of each of the at least two other electronic messages being distinct from the contents of the another electronic message, so that the automatically generated electronic message can be presented to a user with the contents of the at least two other electronic messages without the user being presented with redundant copies of the contents of the another electronic message.

* * * * *

UNITED STATES PATENT AND TRADEMARK OFFICE
CERTIFICATE OF CORRECTION

PATENT NO. : 6,496,853 B1
DATED : December 17, 2002
INVENTOR(S) : Dean A. Klein

It is certified that error appears in the above-identified patent and that said Letters Patent is hereby corrected as shown below:

Column 8,
Line 56, "for message MS" should read -- for message M5 --

Column 10,
Line 60, "that share a common with subject" should read -- that share a common ancestor with the selected message will include at least some contents in common with the selected message.
  Those skilled in the art will appreciate that messages other than immediate responses can be identified as being related based on the message IDs. For example, message M5 is in the chain of response messages for message M1, and using the example IDs discussed previously, message M5 (with ID 1234-02-01) can be identified as being related to message M1 (with ID 1234) as well as to intermediary message M3 (with ID 1234-02).
Similarly, messages M5 and M6 (with ID 1234-02-02) can be identified as both including the contents of messages with IDs 1234-02 (message M3) and 1234 (message M1). After step 510, the subroutine continues to step 515 to select each message which shares a common ancestor with the selected message. After step 515, the subroutine returns at step 595.
  Figure 6 is an exemplary flow diagram of an alternate embodiment of subroutine 420 in which message subjects are used to identify related messages with redundant contents. In this embodiment, all of the messages in a message thread have related subjects, and the relationships among subjects indicate which messages are responses to which other messages. For example, related message subjects for the messages shown in Figure 2B are discussed above with respect to Figure 3. Those skilled in the art will appreciate that a wide variety of relationships between subjects can be used to indicate response relationships.
The subroutine for Figure 6 begins at step 605 where the subject for the selected message is retrieved. The subroutine continues to step 610 where the retrieved subject is compared to the subjects of the other current retrieved messages in order to identify related messages. Those skilled in the art will appreciate that messages separated by one or more other response messages can be identified as related based on the message subjects. For example, message M5 with subject "RE: RE: XYZ project - 02 - 01" can be identified as being related to message M1 with subject "XYZ project" as well as to message M3 with subject --

UNITED STATES PATENT AND TRADEMARK OFFICE
CERTIFICATE OF CORRECTION

PATENT NO.    : 6,496,853 B1
DATED         : December 17, 2002
INVENTOR(S)   : Dean A. Klein It is certified that error appears in the above-identified patent and that said Letters Patent is hereby corrected as shown below:

<u>Column 11,</u>
Line 12, "message MS" should read -- message M5 --

<u>Column 17,</u>
Line 16, "that message" should read -- that the generated electronic message --

Signed and Sealed this

Twenty-eighth Day of October, 2003

JAMES E. ROGAN
*Director of the United States Patent and Trademark Office*